US005867645A

United States Patent [19]

Olarig

[11] Patent Number: 5,867,645

[45] Date of Patent: Feb. 2, 1999

[54] EXTENDED-BUS FUNCTIONALITY IN CONJUNCTION WITH NON-EXTENDED-BUS FUNCTIONALITY IN THE SAME BUS SYSTEM

[75] Inventor: Sompong Paul Olarig, Cypress, Tex.

[73] Assignee: Compaq Computer Corp., Houston, Tex.

[21] Appl. No.: 723,767

[22] Filed: Sep. 30, 1996

[51] Int. Cl.[6] ...................................................... G06F 11/00

[52] U.S. Cl. ................................ 395/185.01; 395/183.19; 395/182.03

[58] Field of Search ......................... 395/185.01, 182.03, 395/183.01, 182.05, 183.19, 306, 307, 308, 309, 281, 284; 364/268.9, 281.9, 285.3

[56] References Cited

U.S. PATENT DOCUMENTS

| | | | |
|---|---|---|---|
| 5,396,602 | 3/1995 | Amini et al. | 395/325 |
| 5,448,703 | 9/1995 | Amini et al. | 395/290 |
| 5,450,551 | 9/1995 | Amini et al. | 395/299 |
| 5,499,346 | 3/1996 | Amini et al. | 395/308 |
| 5,522,050 | 5/1996 | Amini et al. | 395/306 |
| 5,564,026 | 10/1996 | Amini et al. | 395/308 |
| 5,581,714 | 12/1996 | Amini et al. | 395/308 |
| 5,630,056 | 5/1997 | Horvath et al. | 395/185.09 |
| 5,649,161 | 7/1997 | Andrade et al. | 395/494 |
| 5,666,480 | 9/1997 | Leung et al. | 395/180 |
| 5,754,804 | 5/1998 | Cheselka et al. | 395/306 |
| 5,768,608 | 6/1998 | Nakamura | 395/800 |

*Primary Examiner*—Robert W. Beausoliel, Jr.
*Assistant Examiner*—Stephen C. Elmore
*Attorney, Agent, or Firm*—Jenkens & Gilchrist, P.C.

[57] ABSTRACT

A computer system having an interconnection apparatus for interconnecting processors, peripherals, and memories, including a bus structure with an extended-bus portion and a non-extended-bus portion, and the extended-bus-compliant devices having a status register. The extended-bus-compliant devices are operable in either extended-bus mode involving both the extended-bus portion and non-extended-bus portion of the bus structure, or non-extended-bus mode involving only the non-extended-bus portion. Upon detecting a transmission error or device-related fault, the contents of the status register are altered so as to render the extended-bus-compliant devices operable in the non-extended-bus mode using only the non-extended-bus portion.

15 Claims, 5 Drawing Sheets

EXTENDED-BUS FUNCTIONALITY IN CONJUNCTION WITH NON-EXTENDED-BUS FUNCTIONALITY IN THE SAME BUS SYSTEM

BACKGROUND OF THE INVENTION

1. Technical Field of the Invention

The present invention relates to bus systems, and, in particular, to a fault-tolerant bus system adapted for use in a computer system.

2. Description of Related Art

Improved system performance is a much sought-after goal of paramount significance that has been vigorously pursued in the field of computer systems since its very beginnings. Two avenues have been particularly fruitful: modularization of functional subsystems and superior bus design. Both avenues have resulted in improved system performance. In personal computers, especially, modularization has resulted in a standardized motherboard having a processor unit, on-board memory, and a host of expansion slots into which are plugged various expansion cards providing such enhanced functionality as telecommunications, disk storage and improved video.

On the other hand, the goal of achieving ever-increasing performance criteria for computer systems has also mandated advanced bus design techniques. As is well-known in the art, computer system buses, having a plurality of conductive transmission lines, provide the means for interconnecting a plurality of electronic devices such that the devices may communicate with one another. These buses carry information including address information, control information, and data, in a logical manner as dictated by the design thereof.

This logical manner is commonly referred to as the bus protocol.

The computer system buses typically connect master devices such as processors or peripheral controllers, and slave devices such as memory components and bus transceivers. It should be understood herein that it is common in the art to also refer to slave devices as target devices, and accordingly, these two terms are used hereinafter interchangeably. In general, master devices are the initiators of a transaction involving information transfer across a bus to which they are interconnected. Master devices arbitrate to gain control of the bus and an arbiter is typically provided for resolving arbitration contention using one of several known techniques. On the other hand, slave devices typically operate in conjunction with at least one master device, responsive to control signals received therefrom.

As is well-known, high performance systems impose at least two design objectives in relation to buses: higher throughput of information and fault tolerance. Two approaches are typical in attaining the former objective: (i) increasing the bus transmission speed, and (ii) expanding the bus-width, that is, providing additional transmission lines. Fault tolerance may be understood as the property of a robust bus system wherein the negative effects of errors are minimized, if not eliminated. Fault tolerance may also refer to the capability of an extendable bus system that is operable concurrently with both non-extended-bus-compliant devices and extended-bus-compliant devices even during occurrence of such events as data transmission errors and detection of device-related faults upon initialization. Since inoperable or malfunctioning bus systems would generally cause a computer system in which they are placed to crash, it would be highly beneficial to have a bus system that is fault-tolerant in the sense that the bus system would continue to operate when a device-related fault is detected upon initialization or when an error is encountered during data transmission. Moreover, it can be appreciated that it would be advantageous in a computer system to monitor the occurrences of errors and faults for the purposes of system diagnostics and error recovery management. Accordingly, an efficient error reporting scheme is also a desirable design objective which would lead to improved system performance.

One of the existing high-performance buses is the 32-bit Peripheral Component Interconnect ("PCI") bus. As is well-known, the 32-bit PCI bus is also extendable to accomodate a 64-bit data path, thereby concurrently supporting both 32-bit-compliant devices and 64-bit-compliant devices. The conventional PCI bus provides several advantages such as, for example, high performance, low cost, ease of use, and high reliability.

In spite of these well-known advantages, it is understood that error reporting and management is highly system dependent for a conventional 32-bit PCI bus, thereby limiting the choices available to system designers. For example, their goal primarily is to handle recoverable errors at the hardware level so as to minimize system downtime. On the other hand, because the 64-bit PCI bus is a relatively new development, there are at present no known solutions that combine efficient error reporting and fault-tolerant characteristics into a robust error management system therefor.

SUMMARY OF THE INVENTION

The present invention overcomes the above-identified problems as well as other shortcomings and deficiencies of existing technologies by providing a computer system having a fault-tolerant interconnection apparatus for interconnecting processors, peripherals and memories, which computer system comprising: a plurality of electronic devices, comprising a first sub-plurality of electronic devices, each of the first sub-plurality of electronic devices being operable in a first mode; and a second sub-plurality of electronic devices, each of the second sub-plurality of electronic devices being operable in one of the first mode and a second mode, wherein each of the second sub-plurality of electronic devices comprises detecting means for detecting an error; and status means for effectuating a change in a mode status associated with each of the second sub-plurality of electronic devices, the status means being actuatable in response to a signal provided by the detecting means. The computer system of the present invention also includes a bus structure comprising a plurality of electrically conductive transmission lines disposed among the plurality of electronic devices for communicating electrical signals therebetween, the plurality of electrically conductive transmission lines comprising a first sub-plurality of electrically conductive transmission lines and a second sub-plurality of electrically conductive transmission lines. In one aspect of the present invention, the status means comprises a status register, the contents of the status register being alterable in response to the signal provided by the detecting means; and the first mode involves using the first sub-plurality of electrically conductive transmission lines and the second mode involves concurrently using the first sub-plurality of electrically conductive transmission lines and the second sub-plurality of electrically conductive transmission lines. Also, in a presently preferred exemplary embodiment of the present invention, the detecting means comprises means for effectuating a built-in-self-test to determine if a device belonging to the second sub-plurality of electronic devices is operable in the second mode after system initialization. The detecting means also comprises parity error means and system error means, each of which is coupled to one of the plurality of electrically conductive transmission lines, respectively.

In a further aspect, the present invention relates to a method for managing a bus system having an extended-bus portion and a non-extended-bus portion, the bus system being disposed among at least one extended-bus-compliant device and at least one non-extended-bus-compliant device, wherein the extended-bus-compliant device comprises a status register and means for conducting a built-in-self-test and for detecting an error associated with data transmission over the extended-bus portion, the method comprising the steps of: conducting a built-in-self-test for the extended-bus-compliant device upon initialization; operating the extended-bus-compliant device in an extended-bus mode if it passed the built-in-self-test, otherwise operating the extended-bus-compliant device in a non-extended-bus mode; and continuing to operate the extended-bus-compliant device in the extended-bus mode after determining it passed the built-in-self-test until a data transmission error is detected, whereupon reporting the occurrence of the data transmission error to an operating system and operating the extended-bus-compliant device in the non-extended-bus mode.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
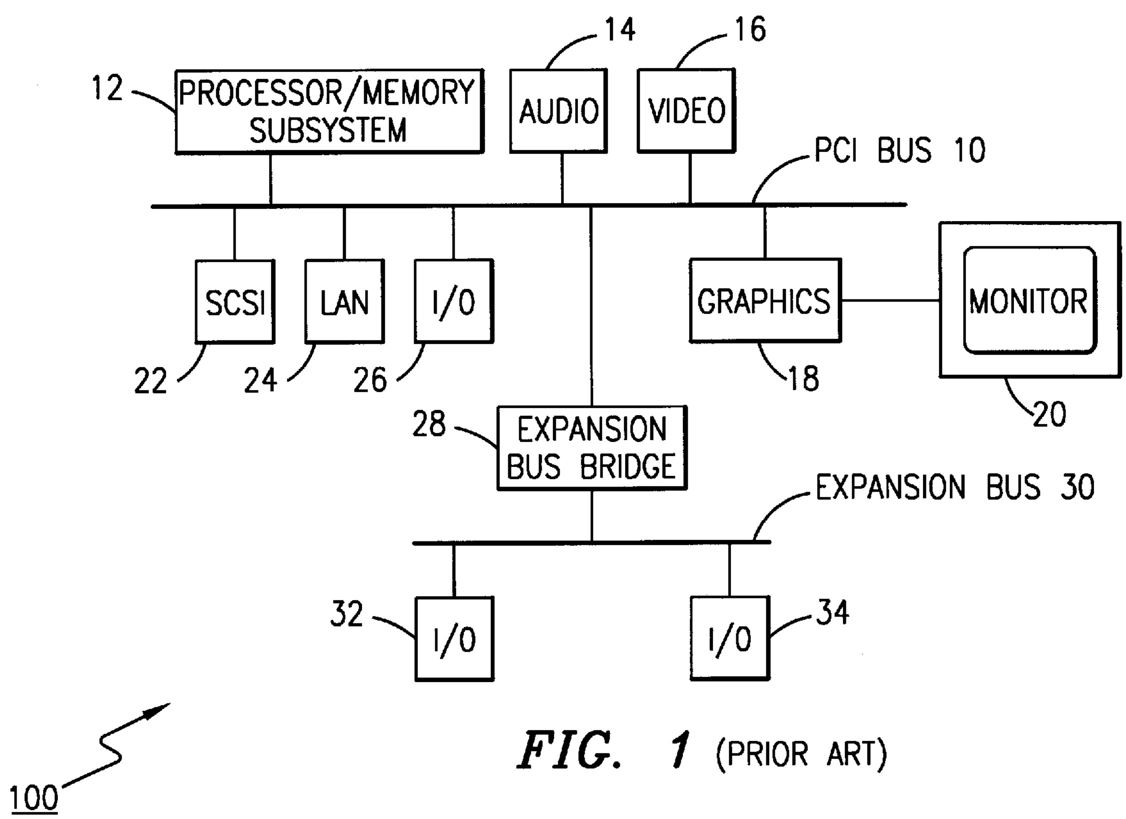
FIG. 1 illustrates a block diagram of a PCI-based computer system in which the teachings of the present invention may be incorporated.

Referring now to the Drawings wherein like or similar elements are designated with identical reference numerals throughout the several views, and wherein the various elements depicted are not necessarily drawn to scale, and, in particular, to FIG. 1, there is shown a block diagram of an exemplary configuration of a computer system 100 having a plurality of electronic devices interconnected with a PCI bus 10. A processor/memory subsystem 12 is coupled to the PCI bus 10, as are such peripherals as audio board 14, video board 16, and video graphics controller 18. The video graphics controller 18 is connected to a monitor 20 for controlling video information provided thereto.

Continuing to refer to FIG. 1, the PCI bus 10 is also connected to additional peripherals such as a Small Computer System Interface ("SCSI") controller 22, a network controller 24 and other input/output devices, for example, I/O 26. To preferably provide increased capability, the exemplary computer system 100 also includes an expansion bus bridge 28 (also known as a bus-to-bus bridge) that is electrically disposed between an expansion bus 30 and the PCI bus 10 and that provides a communication path therebetween. Further, the expansion bus 30, which may be any known bus such as, for example, the Extended Industry Standard Architecture ("EISA") bus, is provided with a plurality of input/output boards, for example, I/O 32 and I/O 34.

Still continuing to refer to FIG. 1, the processor/memory subsystem 12 may directly access via the PCI bus 10 any peripheral device, for example, the SCSI controller 22, that is mapped in the memory or the I/O address space associated therewith. As is understood in the art, the plurality of devices connected to the PCI bus 10 may be any one of three classes: master, slave, or master-slave combination. To the extent that all these components are compliant with the PCI specification, the PCI bus 10 becomes essentially a "very large scale" interconnect, with no "glue" logic being necessary.

Figure 2:
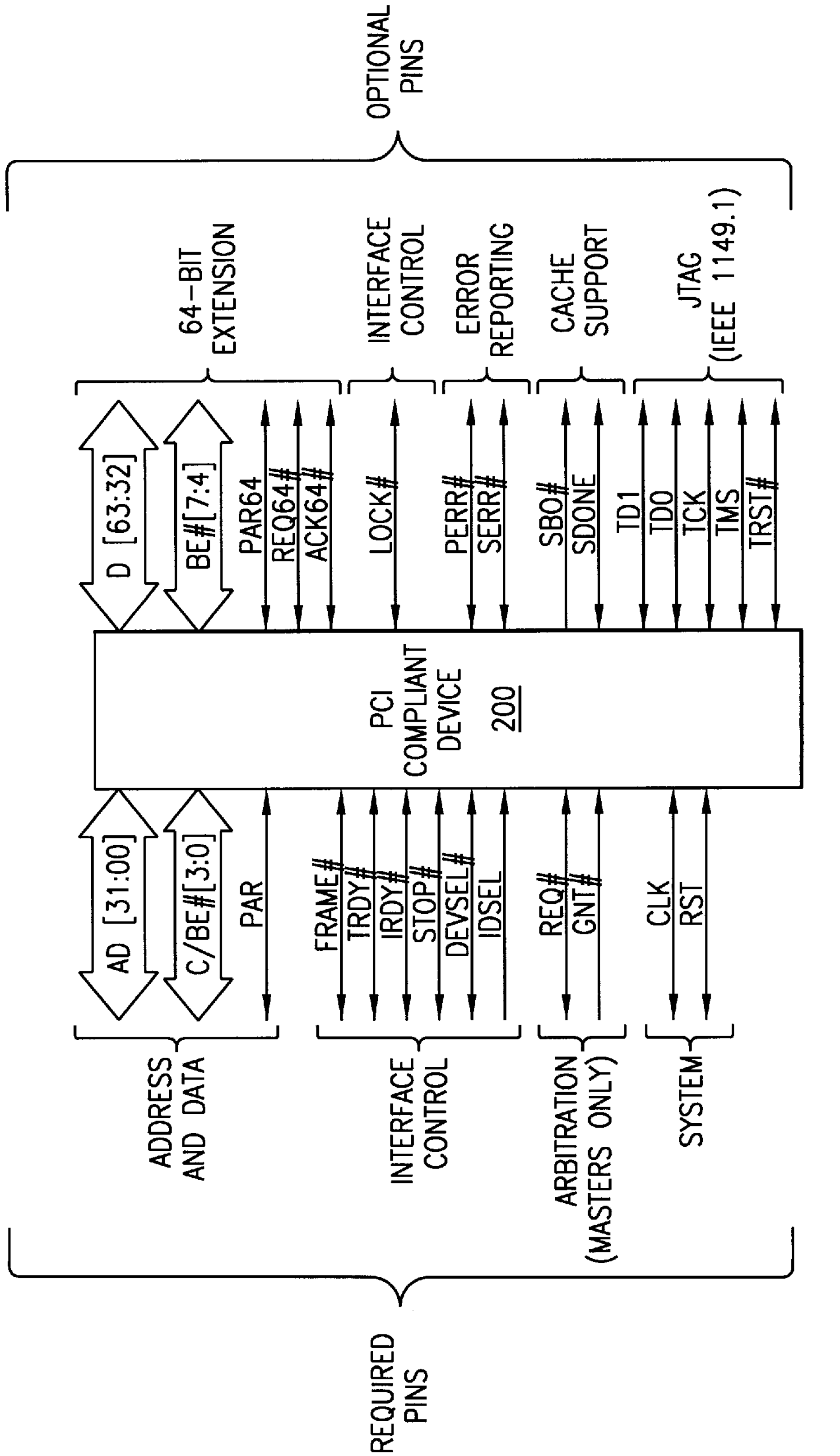
FIG. 2 illustrates signal pins and definitions thereof for a conventional PCI-compliant device.

FIG. 2 depicts signal pins and labels thereof associated with a PCI-compliant device 200 (also synonymously referred to as an "agent" hereinafter) adapted for use with the PCI bus 10 (shown in FIG. 1) in either 32-bit mode operation or in an extended 64-bit mode operation. As is known in the art, the PCI bus 10 requires for 32-bit mode operation a minimum of 45 signal pins for a slave-only device and 47 signal pins for a master-only or master-slave device to handle data and addressing, interface control, arbitration, and system functions. Optional error reporting requires two additional signal pins: PERR# and SERR#. When available with an extended bus-width, the PCI bus 10 provides additional data bandwidth for the devices, for example, PCI-compliant device 200, that require it. The high, or upper, 32-bit extension portion for 64-bit devices requires an additional 39 signal pins: REQ64#, ACK64#, AD{63::32}, C/BE#{7::4}, and PAR64.

Continuing to refer to FIG. 2, it can be seen that the signal pins depicted therein are grouped into two broad functional groups: required signal pins, indicated on the left side of the PCI-compliant device 200, and optional and extension signal pins on the right side.

It is helpful to define herein certain signal conventions that are used in describing the aforementioned signal pins. A selected subset of the signals are described below in more detail. More information on these and other signals may be found in the document "Peripheral Component Interconnect Specification," Revision 2.1, Jun. 1, 1995, at Chapters 1 and 2 incorporated by reference herein. It will be understood that these definitions are useful in gaining a fuller appreciation of the teachings of the present invention. The signal conventions are set forth immediately below:

1. The "#" symbol at the end of a signal name indicates that the signal is active low, that is, the signal is asserted when the voltage on the signal line is at a low voltage. If there is no such symbol, on the other hand, then the signal is active high.
2. The "(in)" symbol indicates that the signal is a standard input-only signal.
3. The "(out)" symbol indicates that the signal is a totem-pole output, that is, a standard actively-driven signal.
4. The "(t/s)" symbol indicates a tri-state signal, that is, a tri-stated, bi-directional, input/output signal.
5. The "(s/t/s)" symbol indicates a sustained tri-state signal wherein an active low tri-state signal is owned and driven by one device at a time. The device that drives a (s/t/s) signal low must drive it high for at least one clock period before letting it float.

6. The "(o/d)" symbol indicates an open drain signal which allows multiple devices to share as a wire-OR. A pull-up is required to sustain the inactive state until another agent drives it.

Still continuing to refer to FIG. 2, a subset of the signals provided for the PCI-compliant device 200 are described below.

1. CLK (in)

The CLK (clock) signal, which is an input signal to every PCI-compliant device, for example the PCI-compliant device 200, provides a time base for all transactions on the PCI bus 10 (shown in FIG. 1).

2. AD{31::00}(t/s)

The AD (address and data) signals are multiplexed on the same transmission lines of the PCI bus 10. During the first clock cycle of a transaction, the AD signals contain a 32-bit device address. During subsequent clock cycles, the AD signals may contain up to 4 bytes of data.

3. FRAME# (s/t/s)

The FRAME# (cycle frame) signal is driven by the current master device to indicate the beginning and duration of an access. The FRAME# is asserted to indicate that a bus transaction is commencing. As long as the FRAME# signal is asserted, information transfers continue. On the other hand, the FRAME# is de-asserted when the transmission is in its final phase.

4. TRDY# (s/t/s)

The TRDY# (target ready) signal indicates the target device's ability to complete the current data phase of the bus transaction. The TRDY# signal is used in conjunction with the IRDY# signal described hereinbelow. A data phase is completed on the rising edge of any clock cycle where both the TRDY# and the IRDY# signals are asserted. During a read operation, the TRDY# indicates that valid data is present on the AD signal lines. During a write operation, the TRDY# signal indicates that the target device is ready to accept data. One or more wait cycles may be inserted until both the IRDY# and TRDY# signals are asserted synchronously.

5. IRDY# (s/t/s)

The IRDY# (initiator ready) signal indicates the initiating device's (or, master device's) ability to complete the current data phase of the transaction. As mentioned above, the IRDY# signal is used in conjunction with the TRDY# signal. A data phase is completed on any clock cycle when both the IRDY# and TRDY# signals are asserted. During a write operation, the IRDY# signal indicates that valid data is present on the AD signal lines. On the other hand, during a read operation, the IRDY# signal indicates that the master device is prepared to accept data. One or more wait cycles may be inserted until both the IRDY# and TRDY# signals are asserted synchronously.

6. DEVSEL# (s/t/s)

The DEVSEL# (device select) signal, when actively driven, indicates that the driving device has decoded its address as the target device for the current bus transaction. As in input, the DEVSEL# signal indicates whether any device on the bus has been selected.

7. REQ# (t/s)

The REQ# (request) signal, asserted by a master device, indicates to a central bus arbiter that the device wants to gain control of the bus. The REQ# signal is a point-to-point signal, and every master device and master-slave device has its own REQ# signal connection with the arbiter.

8. GNT# (t/s)

The GNT# (grant) signal indicates to the master device that access to the bus has been granted by the arbiter. Like the REQ# signal, the GNT# signal is a point-to-point signal, and every master and master-slave device has its own GNT# signal connection to the arbiter.

9. REQ64# (s/t/s)

The REQ64# (request 64-bit transfer) signal is asserted by a master device desirous of negotiating a 64-bit bus transaction with a 64-bit slave device. By actively driving this signal, the current bus master indicates its desire to transfer data using 64 bits. The REQ64# signal has the same timing as the FRAME# signal, described above. The REQ64# signal is used during system reset to distinguish between agents that are connected to a 64-bit data path and those that are not. A central resource drives REQ64# low during the time when the RST# (reset) signal is asserted. Agents that can sample REQ64# asserted during reset are connected to the 64-bit data path, while those that do not sample the REQ64# assertion are not.

10. ACK64# (s/t/s)

The ACK64# (acknowledge 64-bit transfer) signal, when actively driven by the agent that has positively decoded its address as the target of the current bus transaction, indicates that the target is willing to transfer data using 64 bits. The ACK64# has the same timing as the DEVSEL# signal.

11. C/BE#{3::0} (t/s)

The C/BE# (command and byte enable) signals are multiplexed on the same signal transmission lines of the PCI bus 10. During the address phase of a bus transaction, the C/BE# signals define a bus command. On the other hand, during the data phase of the transaction, these signals are used as "byte enables" for the 32 (that is, up to four bytes) AD signals. The byte enables determine which byte "lanes," that is, 8-bit wide transmission lines, of the AD signal lines carry legitimate data. For example, the C/BE#{0} signal applies to byte 0 of the 4-byte AD signals, if asserted, it indicates that valid byte data is present on lines AD#{7::0}.

12. C/BE#{7::4} (t/s)

The high (i.e., upper) C/BE# (command and byte enable) signals, used for the 64-bit extension, are multiplexed on the same transmission lines of the PCI bus 10. During an address phase when REQ64# is asserted, a pre-defined command is transferred on C/BE#{7::4}; otherwise, these bits are reserved and indeterminate. On the other hand, during a data phase, these bits function as byte enables, indicating which byte lanes in the extended portion of the 64-bit data path carry meaningful data when REQ64# and ACK64# are both asserted. For example, C/BE#{7} applies to byte 7 data present on AD{63::56}.

13. AD{63::32} (t/s)

The upper AD (address and data) signals are multiplexed on the same transmission lines of the PCI bus 10. During an address phase, when REQ64# is asserted and a Dual Address Cycle ("DAC") is used, the upper 32-bits of a 64-bit address are transferred; otherwise these bits are reserved for future use. During a data phase, an additional 32-bits of data are transferred when both REQ64# and ACK64# are both asserted.

14. PAR64 (t/s)

The PAR64 (upper parity) signal is the even parity bit that protects the upper AD and C/BE# lines. PAR64 is valid for one clock after the initial address phase when REQ64# is asserted and the DAC command is indicated on C/BE#{3::0}. PAR64 is also valid for the clock after the second address phase of the DAC command when REQ64# is asserted. The PAR64# is stable and valid for data phases when both REQ64# and ACK64# are asserted and one clock after either IRDY# is asserted on a write transaction or TRDY# is asserted on a read transaction. Once PAR64 is valid, it remains valid for one clock after the completion of the data phase.

15. PERR# (s/t/s)

The PERR# (parity error) signal is used only for the reporting of data parity errors during all bus transactions except a Special Cycle command. The PERR# signal pin is sustained tri-state and must be driven active by the agent receiving data two clock periods following the data when a data parity error is detected. An agent cannot report a PERR# until it has claimed the access by asserting DEVSEL# (for a target) and completed a data phase or is the master of the current bus transaction.

16. SERR# (o/d)

The SERR# (system error) signal is for reporting address parity errors, data parity errors that may occur during a Special Cycle command, or any other system error where the result will be catastrophic. SERR# is pure open drain and is actively driven for a single bus clock period by the agent reporting the error. The agent that reports SERR# to the operating system does so anytime SERR# is sampled asserted.

Taking now FIGS. 1 and 2 together, basic bus transaction control relating to the PCI bus 10 may be described. As will be understood later, this description is helpful in appreciating the teachings of the present invention relating to fault-tolerant operation of the PCI bus 10 involving extended-bus (that is, 64-bit) transactions with 64-bit PCI-compliant devices.

In order to minimize access latency, the PCI bus 10 specification uses an arbitration approach to bus transactions that is access-based, rather than time-slot-based. Thus, a master device must arbitrate for each access to the PCI bus 10 in order to effectuate a bus transaction.

Figure 3:
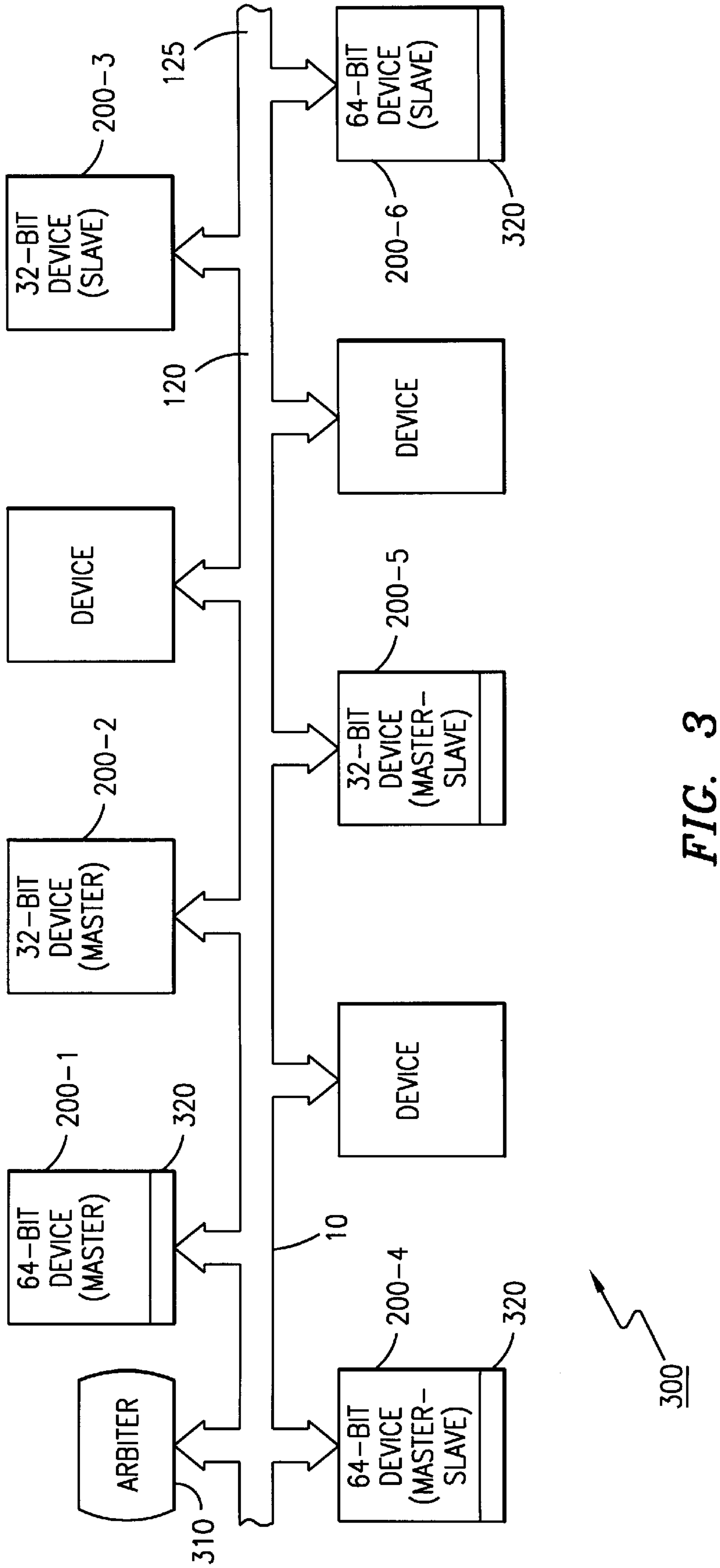
FIG. 3 depicts a block diagram of a PCI bus system disposed among a plurality of electronic devices comprising extended-bus-compliant devices and non-extended-bus-compliant devices, wherein the extendedbus-compliant devices are modified in accordance with the teachings of the present invention.

In accordance with the present invention, a central arbitration scheme may preferably be used, wherein each master device has its REQ# signal line and GNT# signal line connected to a central arbiter 310 (shown in FIG. 3). A simple request-grant handshake between the central arbiter 310 and the master device is used to gain access to the PCI bus 10. It should, however, be understood by those skilled in the art upon reference hereto that any specific arbitration algorithm may be implemented by the central arbiter 310, such as for example, priority, rotating priority (round-robin), "fair," et cetera. Preferably, the bus arbitration occurs during a previous access so that no bus cycles are consumed due to the execution of arbitration algorithm implemented.

To initiate arbitration, a master device asserts its REQ# signal to which the central arbiter 310 (shown in FIG. 3) is electrically coupled. When the central arbiter 310 determines that the master device may use the PCI bus 10, it asserts the GNT# signal associated with the master device. Since the central arbiter 310 may de-assert a device's GNT# signal on any clock, the master device whose GNT# signal is asserted by the central arbiter 310 must insure that its GNT# is asserted on the clock edge it wants to start a bus transaction.

Assertion of the GNT# signal normally grants a device access to the PCI bus 10 for a single transaction. If the device desires another access, it should continue to assert its REQ# signal. Should the REQ# signal be de-asserted, the central arbiter may interpret this to mean that the device no longer requires use of the bus and may de-assert the device's GNT# signal.

Once the bus ownership has been granted to a master device, the FRAME# signal is asserted by the master device to indicate the beginning of the transaction. The first rising edge on the CLK signal on which the FRAME# signal is asserted commences the address phase, and the address and bus command code signals are asserted on the AD# and C/BE# signal lines on that clock edge.

The next clock edge begins the first of one or more data phases, during which data is transferred by the AD#{31::0} signals between the master device and the target device on each clock edge for which both the IRDY# and TRDY# signals are asserted by the master device and the target device, respectively. As stated hereinabove, one or more wait cycles may be inserted in a data phase by either the master device or the target device with the IRDY# and TRDY# signals.

When the master device intends to complete only one additional data transfer (which could, in some instances, be immediately after the address phase), the FRAME# signal is de-asserted and the IRDY# signal is asserted indicating that the master device is ready. By asserting the TRDY# signal, the target device indicates the completion of the final data transfer. Thereafter, the master-target relationship via the PCI bus 10 returns to the idle state with both the FRAME# and IRDY# signals being de-asserted.

Referring now to FIG. 3, there is shown a block diagram of an exemplary interconnection apparatus, generally at 300, including the PCI bus 10 disposed among a plurality of devices. Connected to the PCI bus 10 is a central arbiter 310 for managing the bus arbitration protocol described in detail in the foregoing description. Although the ends 120 and 125 of the PCI bus 10 are shown without any termination, it can be appreciated by those skilled in the art that the present invention may be practiced regardless of what, if any, termination schemes are employed at ends 120 and 125.

Continuing to refer to FIG. 3, it can be seen that the plurality of PCI-compliant devices connected to the PCI bus 10 comprise a first sub-plurality of 64-bit-compliant devices, for example, a 64-bit master device 200-1 and a 64-bit slave or target device 200-6; a second sub-plurality of 32-bit-compliant devices, for example, a 32-bit master device 200-2 and a 32-bit slave or target device 200-3. Further, as described hereinabove, the PCI bus 10 may also be connected to master-slave combination devices, for example, a 64-bit master-slave device 200-4 and a 32-bit master-slave device 200-5. It should be appreciated that each of the plurality of PCI-compliant devices depicted in FIG. 3 comprises such appropriate signal pins as described in reference to and depicted in FIG. 2. Further, in accordance with the teachings of the present invention, each of the 64-bit devices, for example, the 64-bit master 200-1; the 64-bit slave 200-6; and the 64-bit master-slave 200-4, is provided with a status register ("SR") 320. In further accordance with the teachings of the present invention, the contents of SR 320 correspond to the mode of operation of the 64-bit device with which it is associated. In a presently preferred exemplary embodiment of the present invention, the status register 320 is a 1-bit register for storing either a binary "1" or "0" in accordance with the present teachings.

As is known in the art, both 32-bit agents and 64-bit agents coexist on the PCI bus 10 such that 64-bit transactions are totally transparent to 32-bit agents, for 64-bit agents default to 32-bit mode unless a 64-bit transaction is negotiated. Pursuant to the present invention, 64-bit transactions on the PCI bus 10 are dynamically negotiated, once per transaction, between a master, for example, the 64-bit master device 200-1, and a target, for example, the 64-bit target device 200-6. This is accomplished by the master device 200-1 asserting its REQ64# and the target 200-6 responding to the asserted REQ64# by asserting ACK64#. Once a 64-bit transaction is negotiated, it holds preferably until the end of the transaction. Therefore, the ACK64# signal of the target 200-6 must not be asserted unless the REQ64# signal of the corresponding master, for example, the 64-bit master 200-1, has been sampled asserted during the same transaction. It should be understood that the REQ64# and ACK64# signals of the 64-bit agents are externally pulled up to ensure proper behavior when 32-bit agents and 64-bit agents are mixed in a bus system, for example, bus system 300.

Typically, after a system reset, the central resource/arbiter 310 controls the state of the REQ64# signal line connected to a 64-bit agent, for example, the 64-bit master 200-1, to inform the agent that it is connected to an extended, 64-bit bus, for example, the PCI bus 10. If REQ64# is asserted when RST# is de-asserted, then the agent is connected to a 64-bit bus. On the other hand, if REQ64# is de-asserted when RST# is de-asserted, the agent is not connected to a 64-bit bus.

As described in the foregoing description in reference to FIG. 2, the PERR# signal pin is commonly used to report a data parity error that may occur during a data transmission operation between the current master and its target. It can be readily appreciated that the error be preferably recoverable at the lowest level possible (that is, for example, at the hardware level). If the error is not recoverable, then it is preferred that the error should be at least reported to the operating system associated with the computer system 100 (shown in FIG. 1) in which the PCI bus 10 is employed. As can be appreciated by those skilled in the art, error reporting is highly system dependent for an existing 32-bit PCI bus, thereby constraining suitable choices available to system designers. Moreover, as elaborated in the foregoing sections, the amalgamation of 64-bit devices with 32-bit devices on the same PCI bus would require a robust error management scheme so that data transmission errors do not give rise to an unacceptable level of system crashes.

Still continuing to refer to FIG. 3, it is seen that according to the teachings of the present invention, each 64-bit agent is provided with the status register 320 for the purposes of robust error management. As will be seen hereinbelow, this status register 320 may be advantageously utilized in providing a computer system, for example, the computer system 100 (shown in FIG. 1) that is impervious to crashing, should a data transmission error or device-related hard fault occur.

Taking FIGS. 3, 4A and 4B together, a presently preferred method in accordance with the teachings of the present invention for managing the PCI bus 10 and data errors associated therewith can now be described.

Figure 4A:
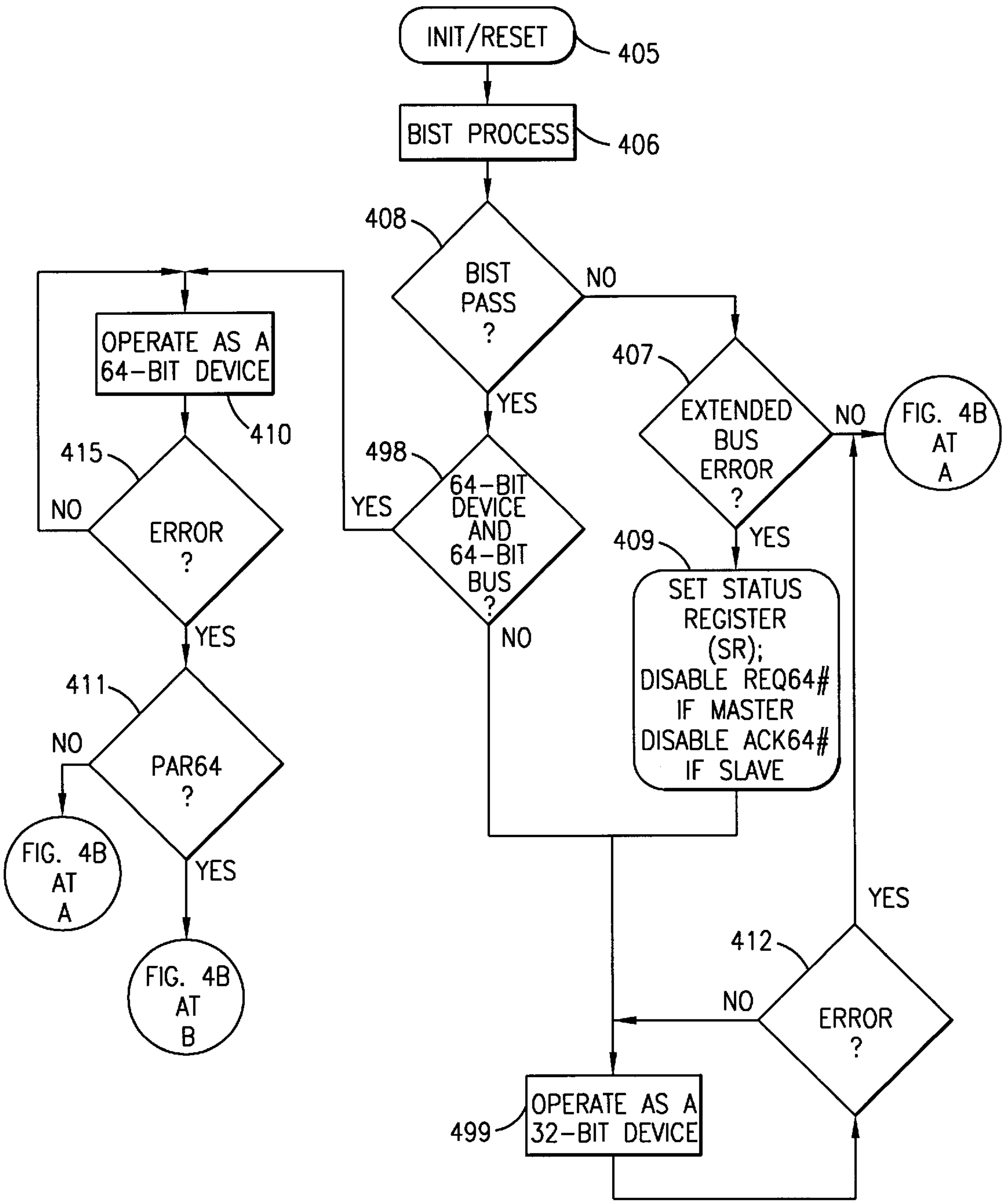
FIGS. 4A and 4B illustrate a flow diagram for an exemplary error management scheme that may be incorporated in a computer system of the type depicted in FIG. 1 in accordance with the teachings of the present invention.
Figure 4B:
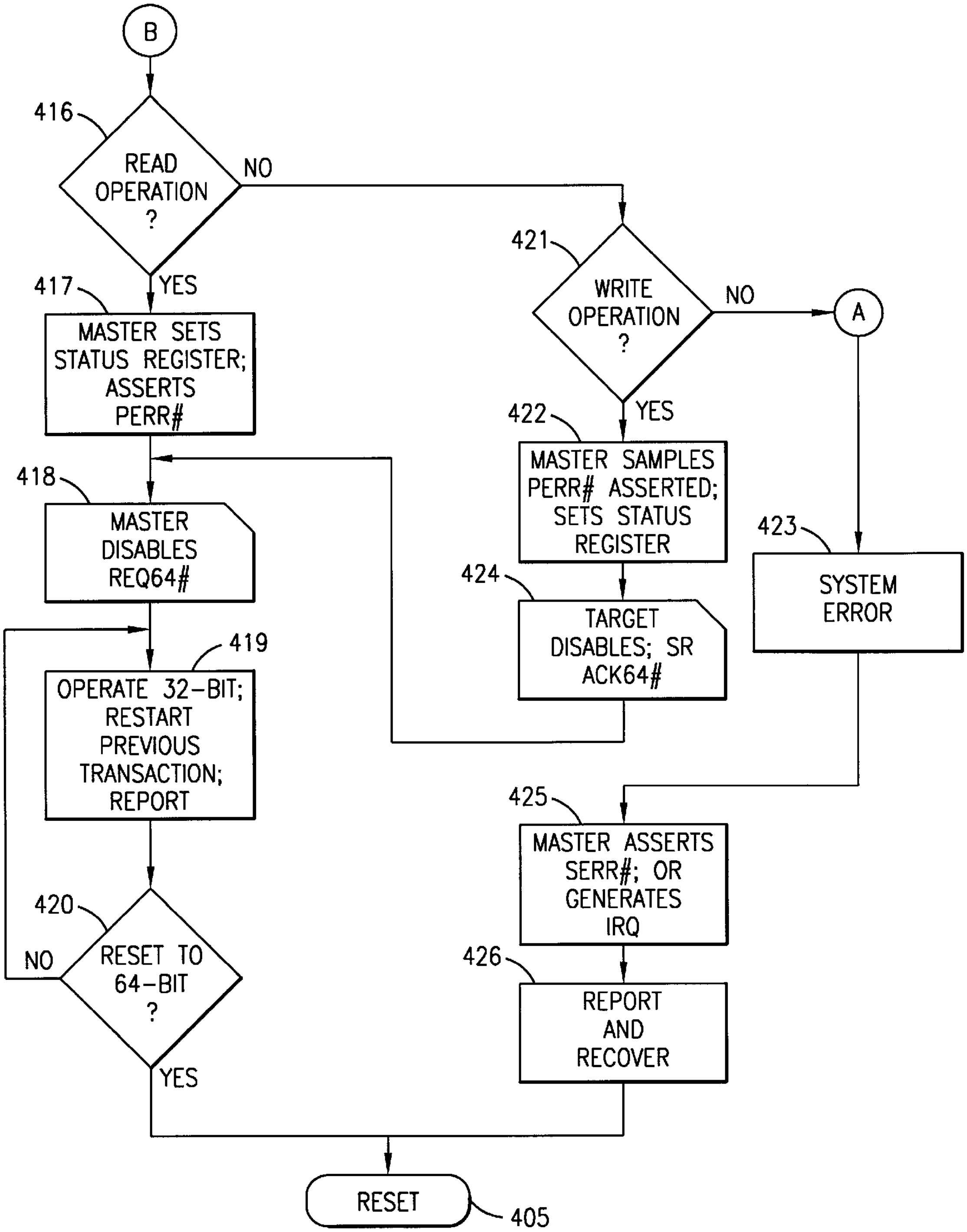

Referring now specifically to FIGS. 4A and 4B, therein is shown a flow chart for the steps of the presently preferred error management method according to the teachings of the present invention. After a system initialization or reset step 405, a PCI-compliant device such as PCI device 200 (shown in FIG. 2) undergoes a "Built-In-Self-Test (BIST) Process" as indicated in step 406. It should be understood that the preferred implementation may include a test interface such as for example the Joint Test Action Group ("JTAG")-type test access port and boundary scan architecture as specified in *IEEE Standard* 1149.1 by utilizing the optional JTAG pins on the PCI device 200. It may also be appreciated that a conventional Power-On-Self-Test ("POST") may also be incorporated in the BIST process step 406. Furthermore, a central BIST/JTAG master may be provided for centralized testing if all the devices that are connected to the PCI bus 10 (shown in FIG. 3) are provided with a JTAG test interface. On the other hand, it is feasible to localize the testing process by incorporating the self-test functionality into the device itself. Accordingly, it should be realized by those skilled in the art that these and other modifications are contemplated to be within the scope of the present invention.

Continuing to refer to FIG. 4A, a decision block 408 is entered for determining whether the PCI-compliant device 200 has passed the BIST. If the determination is No, then another decision block 407 is entered for determining if the BIST failure is localized to the extended portion (that is, the upper 32-bit portion) of the PCI bus 10. If it is, then by taking the YES path from the decision block 407, the status register (SR) 320 for that device is set as indicated in step 409. Further, as shown in step 409, the REQ64# signal pin is disabled if the device is a 64-bit master such as the 64-bit master agent 200-1; and similarly, the ACK64# signal pin is disabled if the device is a 64-bit slave such as the 64-bit slave agent 200-6. As described hereinabove in relation to FIG. 3, in the presently preferred embodiment the status register 320 may be a 1-bit register, and a binary value of 1 is stored in this register once the 64-bit agent fails its BIST. Thereafter, the 64-bit device operates as a 32-bit device as shown in step 499 until an error is detected. This is shown in the decision block 412. If the BIST failure is not localized to the extended portion of the PCI bus 10, or if an error is detected when the 64-bit device is operating in 32-bit mode, then the flow control is transferred to Point "A" in FIG. 4B which will be described shortly hereinbelow.

Still continuing to refer to FIG. 4A, if the PCI-compliant device 200 has passed the BIST, a further determination is made if it is a 64-bit device connected to a 64-bit PCI bus as provided in the decision block 498. If the determination is NO, then the device is a 32-bit device, or, a 64-bit device that has defaulted to 32-bit mode, and the device operates in that mode as previously described in reference to step 499. Otherwise, by taking the YES path from the decision block 498, the device operates as a 64-bit device as shown in step 410. The 64-bit PCI-compliant device continues to operate in 64-bit mode until an error is detected as provided in the decision block 415. If the error is related to 64-bit data transmission, which is determined by testing if the PAR64 signal is asserted as shown in the decision block 411, then the flow control is transferred to Point "B" in FIG. 4B. Otherwise, the flow control is transferred to Point "A" in FIG. 4B.

Continuing to specifically refer to FIG. 4B, at Point "B", should there be a parity error associated with a read operation (decision block 416), the master device, for example, the 64-bit master 200-1 in FIG. 3, asserts its PERR# signal and sets its status register bit (step 417). Thereafter, the master disables its REQ64# (step 418) and reports the error to system software and restarts the previous transaction as a 32-bit device, as provided in step 419.

Still continuing to refer to FIG. 4B, if the detected error is associated with a write operation (decision block 421), the master samples the PERR# asserted by the target device, for example, the 64-bit slave 200-6 in FIG. 3. In response to the asserted PERR#, the master sets its status register, as provided in 422. The target also sets its own status register having asserted the PERR# (step 424). Both the master and target can now re-engage in the previous transaction in 32-bit mode as shown in step 419. Both the master and target may continue to operate in 32-bit mode until their respective status registers are reset (that is, cleared) whereby a 64-bit operation may once again be commenced, as provided in steps 420, 405, 406, 408 and 498.

Still further continuing to refer to FIG. 4B, if the detected error is not associated with a 64-bit read or write transaction, the flow control is transferred to Point "A". A "system error" step is entered thereafter as provided in step 423. As indicated in step 425, the master may generate an interrupt (IRQ) in response thereto or assert its SERR# signal. Further, preferably, the master may report the error to the system software and recover if possible. Otherwise, the bus operation is aborted until a system reset is provided.

It can be appreciated by those skilled in the art that the present invention, as set forth in the foregoing Detailed Description of Drawings, provides a novel scheme for managing errors associated with data transmission through an extendable bus system coupled to a plurality of devices. Rather than causing the computer system 100 to crash, upon encountering errors in 64-bit transactions, the system is rendered fault-tolerant by re-configuring the extended-bit devices as non-extended-bit devices and restarting the previous transaction in a non-extended-bit mode. It should be understood that by providing a status register with all 64-bit devices to be interconnected with an extended PCI bus and using the contents thereof in accordance with the present invention, the system is rendered more robust.

Although only certain embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, the functionality of the status register may also be achieved using two or more bits rather than a single bit. In addition, the single status register bit may be incorporated into an already-available register capable of storing multiple bits. It should be understood that although a PCI bus is used to illustrate the innovative teachings of the present invention, it is manifestly feasible to extend them to other buses that have extendable bus-width. Accordingly, all such extensions, modifications, rearrangements, substitutions and combinations are contemplated to be part of the scope of the present invention as defined by the following claims.

What is claimed is:

1. A computer system having a fault-tolerant interconnection apparatus for interconnecting processors, peripherals and memories, said computer system comprising:

a plurality of electronic devices, said plurality of electronic devices comprising:

a first sub-plurality of electronic devices, each of said first sub-plurality of electronic devices being operable in a first mode; and a second sub-plurality of electronic devices, each of said second sub-plurality of electronic devices being operable in one of said first mode and a second mode, wherein said each of said second sub-plurality of electronic devices comprises:

detecting means for detecting an error; and status means for effectuating a change in a mode status associated with said each of said second sub-plurality of electronic devices, said status means being actuatable in response to a signal provided by said detecting means; and a bus structure comprising a plurality of electrically conductive transmission lines disposed among said plurality of electronic devices for communicating electrical signals therebetween, said plurality of electrically conductive transmission lines comprising a first sub-plurality of electrically conductive transmission lines and a second sub-plurality of electrically conductive transmission lines such that said first and second sub-plurality of electrically conductive transmission lines form a single bus.

2. The computer system as recited in claim 1, wherein:

said status means comprises a status register, the contents of said status register being alterable in response to said signal provided by said detecting means.

3. The computer system as recited in claim 1, wherein:

said first mode involves using said first sub-plurality of electrically conductive transmission lines.

4. The computer system as recited in claim 1, wherein:

said second mode involves concurrently using said first sub-plurality of electrically conductive transmission lines and said second sub-plurality of electrically conductive transmission lines.

5. The computer system as recited in claim 1, wherein:

said detecting means comprises means for effectuating a built-in-self-test, said built-in-self-test corresponding to one of said second sub-plurality of electronic devices.

6. The computer system as recited in claim 1, wherein:

said detecting means comprises:

parity error means, said parity error means being coupled to one of said plurality electrically conductive transmission lines; and system error means, said system error means being coupled to one of said plurality electrically conductive transmission lines.

7. A system, comprising:

a plurality of devices, wherein a sub-plurality of said plurality of devices are operable in an operating mode, said operating mode being one of a non-extended-bus mode and an extended-bus mode;

a single bus having a first portion of electrically conductive transmission lines and a second portion of electrically conductive transmission lines, said single bus for interconnecting said plurality of devices and for data transmission therebetween;

means for detecting an error associated with said data transmission, said data transmission being effectuated by one of said sub-plurality of devices;

means for conducting a device-specific built-in-self-test for each of said sub-plurality of devices; and means for changing said operating mode associated with said one of said sub-plurality of devices, wherein said one of said sub-plurality of devices is affected with said error.

8. The system as recited in claim 7, wherein:

said changing means is actuatable in response to a signal provided by said detecting means.

9. The system as recited in claim 7, wherein:

said interconnecting means comprises a first plurality of electrically conductive transmission lines and a second plurality of electrically conductive transmission lines.

10. The system as recited in claim 9, wherein:

said non-extended-bus mode involves using said first plurality of electrically conductive transmission lines.

11. The system as recited in claim 9, wherein:

said extended-bus mode involves using simultaneously said first plurality and said second plurality of electrically conductive transmission lines.

12. The system as recited in claim 7, wherein:

said changing means comprises:

status means for storing a binary value, said binary value being associated with one of said non-extended-bus mode and said extended-bus mode.

13. A method for managing a bus system having an extended-bus portion and a non-extended-bus portion, said bus system being disposed among at least one extended-bus-compliant device and at least one non-extended-bus-compliant device, wherein said at least one extended-bus-compliant device comprises a status register and means for conducting a built-in-self-test and for detecting an error associated with data transmission over said extended-bus portion, the method comprising the steps of:

conducting a built-in-self-test for said at least one extended-bus-compliant device upon initialization;

operating said at least one extended-bus-compliant device in an extended-bus mode if it passed said built-in-self-test, otherwise operating said at least one extended-bus-compliant device in a non-extended-bus mode; and continuing to operate said at least one extended-bus-compliant device in said extended-bus mode after determining it passed said built-in-self-test until a data transmission error is detected, whereupon reporting the occurrence of said data transmission error to an operating system and operating said at least one extended-bus-compliant device in said non-extended-bus mode.

14. The method as recited in claim 13, wherein:

said step of operating said at least one extended-bus-compliant device in a non-extended-bus mode involves altering the contents of said status register and further comprises the step of using said non-extended-bus portion of said bus system.

15. The method as recited in claim 13, wherein:

said step of operating said at least one extended-bus-compliant device in said extended-bus mode further comprises the step of using said extended-bus portion of said bus system simultaneously with said non-extended-bus portion of said bus system.

* * * * *